Dec. 2, 1941.  W. J. COULTAS ET AL  2,265,061
WAGON HITCH
Filed Oct. 6, 1939  3 Sheets-Sheet 2
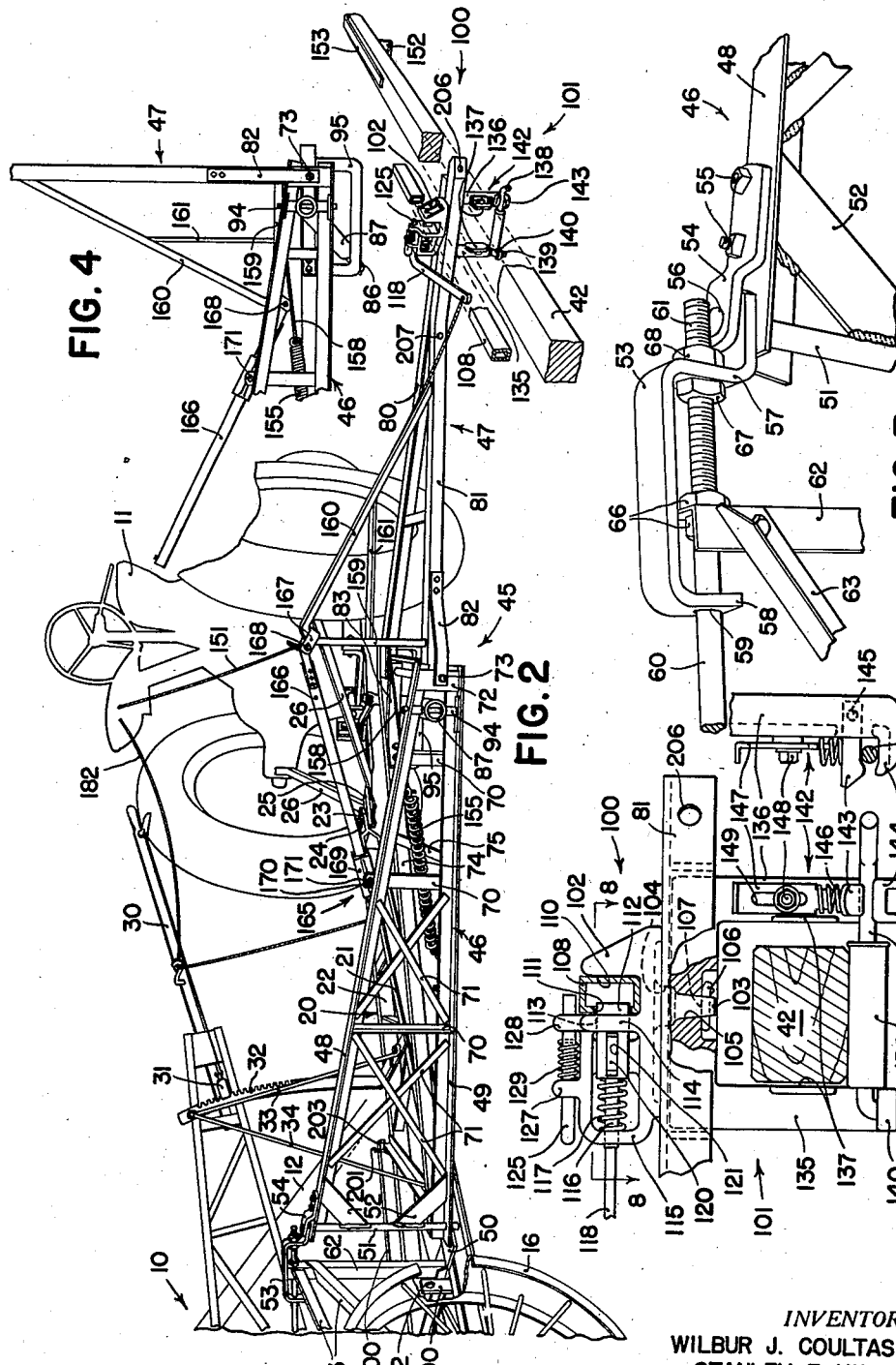
INVENTOR:
WILBUR J. COULTAS &
STANLEY E. HILL
BY
ATTORNEYS.

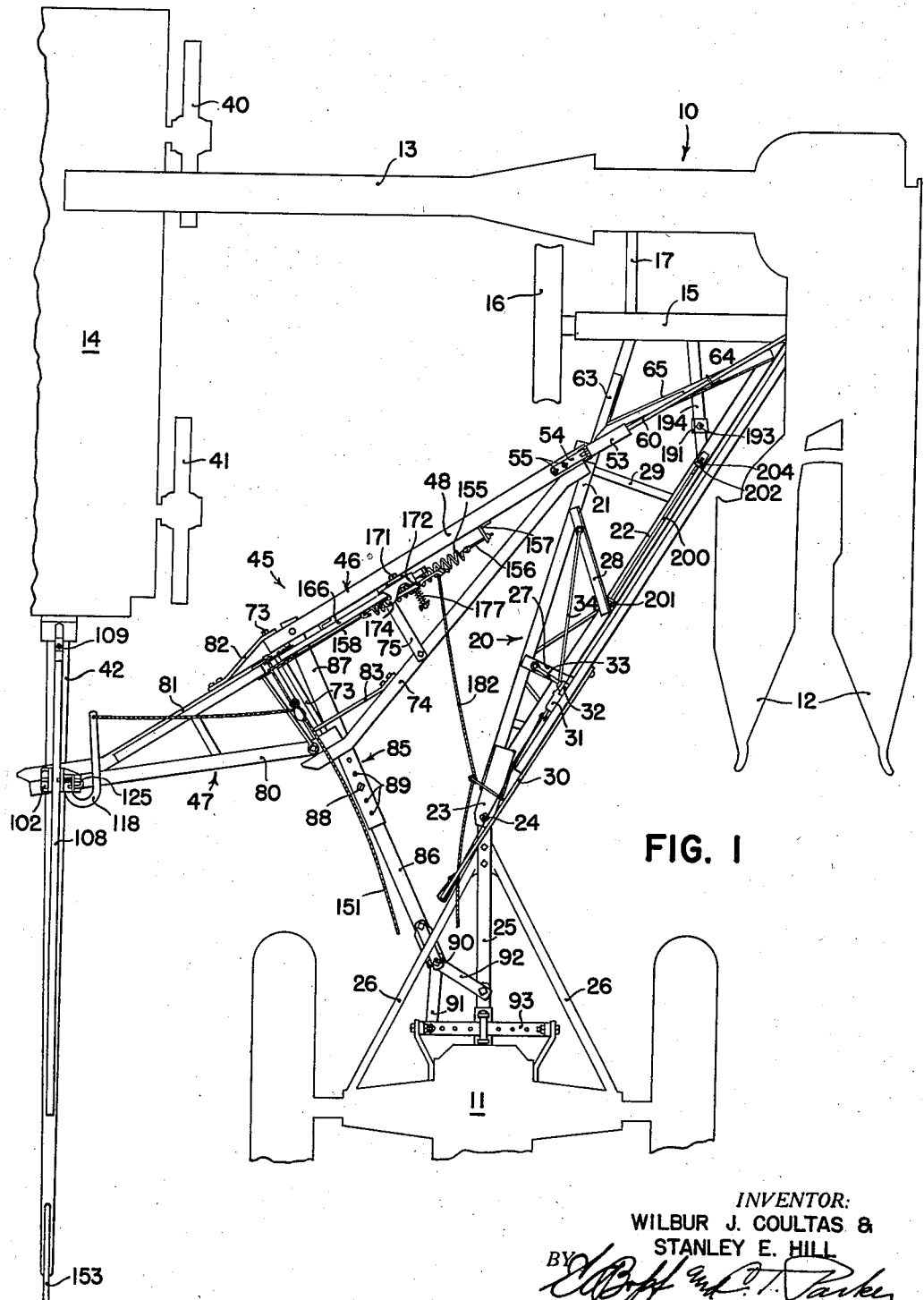

Dec. 2, 1941.  W. J. COULTAS ET AL  2,265,061
WAGON HITCH
Filed Oct. 6, 1939  3 Sheets-Sheet 3
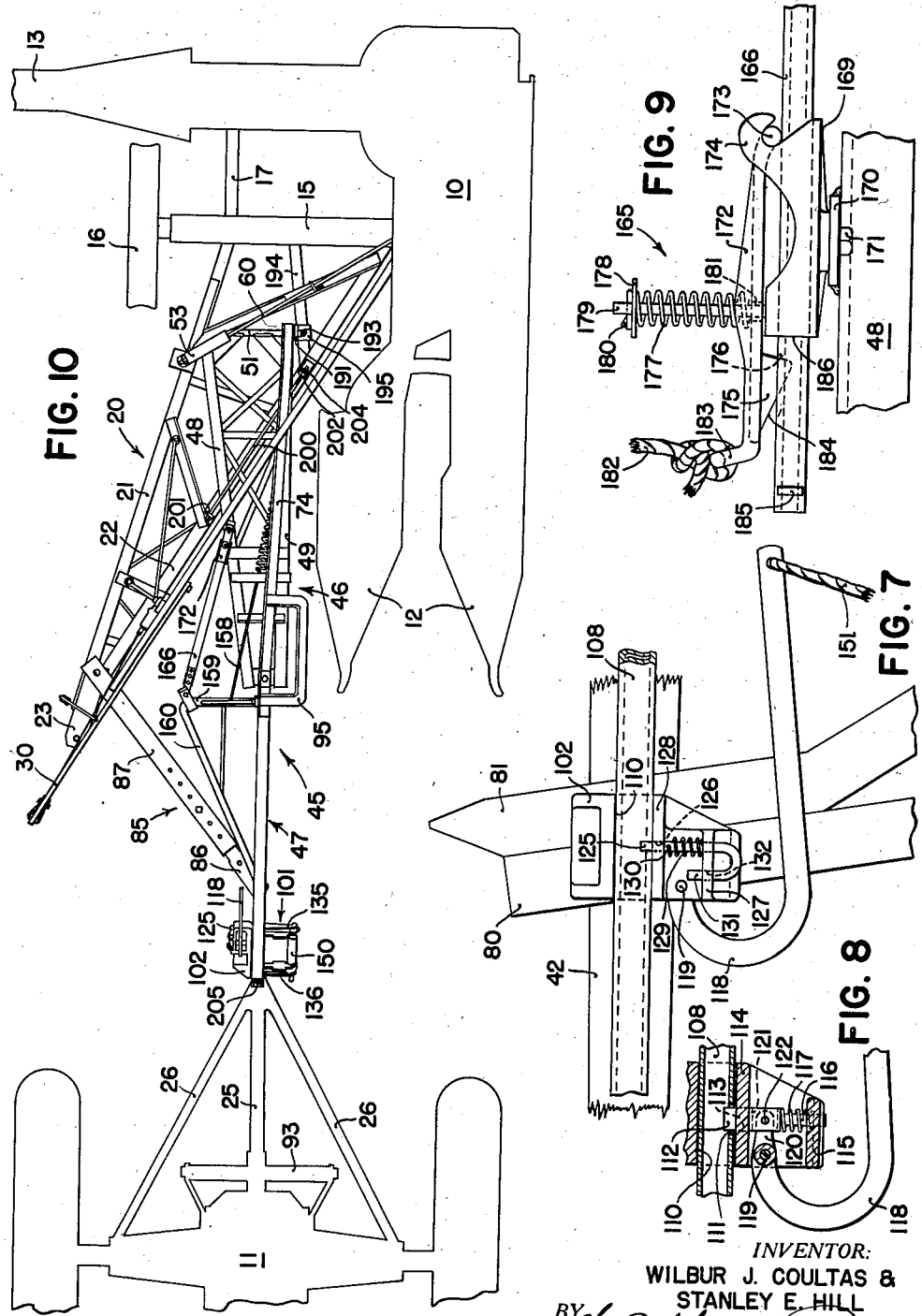
INVENTOR:
WILBUR J. COULTAS &
STANLEY E. HILL
BY
ATTORNEYS.

Patented Dec. 2, 1941

2,265,061

UNITED STATES PATENT OFFICE 2,265,061

WAGON HITCH

Wilbur J. Coultas and Stanley E. Hill, Moline, Ill., assignors to Deere & Company, Moline, Ill., a corporation of Illinois Application October 6, 1939, Serial No. 298,234

23 Claims. (Cl. 280—33.44)

The present invention relates generally to hitch connections and more particularly to a hitch connection of the type adapted for connecting an agricultural implement and a wagon disposed at one side of the latter to a tractor, and is in the nature of an improvement over the device disclosed in Patent No. 1,945,732, granted to W. J. Coultas on February 6, 1934. The principal object and general nature of this invention relates to a wagon hitch beam which is entirely supported on the implement on vertically spaced brackets eliminating the necessity for a ground support but providing for generally horizontal swinging movement of the beam. A further object is to provide an adjustment for at least one of the brackets to adjust the axis of swinging movement angularly relative to the vertical.

Another object of our invention is concerned with the provision of an articulated wagon hitch beam, the outer end of which is suitably counterbalanced, as by means of a spring, to swing out of the way to permit a wagon to be drawn up into hitching position.

A further object is to provide a latch for holding the outer end down during normal operation. The weight of the outer end plus the weight of the wagon tongue is more than sufficient to resist the counterbalancing lifting force under ordinary conditions, but on rolling ground, the tongue occasionally rises relative to the implement draft member, whereupon the side draft occasioned by the offset hitch connections, would cause the articulated beam to buckle to a greater angle, drawing the wagon closer to the implement, after which the weight on the outer end of the beam would not be sufficient to lower the latter against the counterbalancing force and the side draft. We have found that best results are obtained by providing a latch or stop on the hitch beam which prevents the outer end from swinging upwardly beyond an angle of 17 degrees relative to the inner end of the beam.

Still another object relates to the provision of a wagon hitch beam of truss construction that is braced against bending in a vertical plane and in a horizontal plane to provide adequate rigidity.

A further object relates to the provision of connecting means on the implement by which the wagon hitch beam can be connected in substantially fore and aft alignment therewith after being dismounted from its normal operating position, and thereby serving as a draft member for purposes of transporting the implement from one field to another, through narrow roads and gates.

Still another object has to do with the provision of a connecting member at the outer end of the wagon hitch beam, which has a wagon tongue supporting part that is movable out of position to permit the connecting member to be swung into tongue embracing position, after which the tongue supportng part can be secured in place. A related object is the provision for automatically opening the tongue supporting part as one wagon is released therefrom, to place it in open position for receiving another wagon tongue.

These and other objects and advantages will be apparent to those skilled in the art after a consideration of the following description in which reference is had to the drawings appended hereto, in which Figure 1 is a plan view showing hitch connections embodying the principles of our invention for connecting a corn picker and a wagon in laterally spaced position behind a tractor;

Figure 2 is a perspective view of the wagon hitch as observed from a position adjacent the wagon on looking toward the tractor;

Figure 3 is a perspective view of an adjustable device for connecting the wagon hitch beam to the implement;

Figure 4 is a partial elevational view of the wagon hitch beam showing the outer section thereof raised to inoperative position;

Figure 5 is a side elevation of the device for connecting the steering tongue of a wagon to the outer end of the wagon hitch beam;

Figure 6 is a fragmentary side elevation of the tongue supporting member shown in Figure 5 showing the detail of the latching device;

Figure 7 is a plan view of the device shown in Figure 5;

Figure 8 is a sectional plan view taken along a line 8—8 in Figure 5 and showing the details of the latch mechanism for connecting the wagon to the wagon hitch beam;

Figure 9 is a side elevation of a latch device for latching the outer section of the wagon hitch beam in raised position; and Figure 10 is a plan view showing the wagon hitch beam connected to the corn picker in the transport position for towing the implement behind the tractor to and from the field of operations.

Referring now to the drawings, the agricultural implement 10 is indicated as a single row corn picker although we do not intend our invention to be limited to this particular type of implement as the principles of our invention can be applied equally well to various other implements. The implement 10 is disposed in trailing relation behind a tractor 11 and offset laterally therefrom so that the corn picker is in position to harvest a row of corn adjacent to the path of travel of the tractor while the tractor runs over a previously harvested portion of the field. The corn picker 10, which is indicated merely in outline for the sake of simplicity, can be of any suitable design comprising a pair of gathering points 12, suitable snapping rolls on husking mechanism (not shown) and a wagon elevator 13 extending laterally and upwardly in a direction away from the standing corn and adapted to receive the ears of corn from the husking mechanism and conveying them to a wagon 14 which is drawn along with the corn picker, in proper position for receiving the corn therefrom, by means of the hitch connections which will be described in detail presently. The corn picking and husking mechanism is supported on a transverse axle 15 on which is journaled a pair of laterally spaced supporting wheels, one of which is indicated by reference numeral 16. The wagon elevator 13 is supported on the corn picker mechanism and also on a frame member 17 connected to the axle 15. The corn picker is connected to the tractor by means of a draft member 20 including a pair of frame bars 21, 22 fixed at their rear ends in transversely spaced relation to the corn picker axle 15 and extending forwardly and inclined outwardly in a direction away from the standing corn, in forwardly converging relation. The forward ends of the frame bars 21, 22 are connected to a hitch plate 23 which is pivotally connected by means of a pivot bolt 24 to the drawbar 25 of the tractor. The latter is fixed to the tractor and held against lateral movement with respect thereto by means of a pair of diagonal braces 26. The draft frame members 21, 22 are rigidly interconnected by braces 27, 28 and 29. As is well known to those skilled in the art, the gathering points 12 and snapping rolls (not shown) are movable vertically by means of a lever 30 extending forwardly to a position within reach of the tractor operator. The lever is held in adjusted position by suitable latch mechanism 31 which engages a rack 32 mounted on the tractor draft member 20 and rigidly braced by braces 33, 34.

The wagon 14 is supported on a pair of rear wheels 40 and a pair of dirigible front wheels 41, controlled by a steering tongue 42. The wagon 14 is spaced laterally from the corn picker 10 and is offset from the tractor on the side opposite to the corn picker so that the side draft of the wagon balances the side draft of the corn picker. The wagon 14 is propelled and steered by means of a wagon hitch beam 45 which is mounted on the implement and extends forwardly and laterally to a point of connection with the wagon tongue 42.

According to the principles of the present invention the wagon hitch beam 45 comprises a pair of articulated inner and outer sections 46, 47, respectively, the two sections being swingably connected together so that the outer section 47 can be raised to a vertical position so that when one wagon has been filled it can be disconnected and hauled away and an empty wagon substituted therefor without interference by the hitch beam. The inner hitch beam section 46 comprises a pair of vertically spaced outwardly converging frame members 48, 49 having a pair of vertically aligned pivot supports at the inner ends thereof serving as the sole support of the articulated beam 45. The lower beam 49 is supported at its inner end on a pivot plate 50 which is attached to one of the frame members 21 of the implement draft frame 20. The ends of the frame members 48, 49 are interconnected by a vertical hinge rod 51 which is rigidly fixed to the frame members by diagonal braces 52. The hinge rod 51 extends below the lower frame member 49 and is inserted through a suitable aperture in the hinge plate 50, thus forming the lower pivot support. The upper end of the hinge rod 51 extends above the upper frame member 48 and is inserted through a suitable aperture (not shown) in a pivot bracket 53 and thus forming the upper pivot support which is disposed generally in vertical alignment with the lower support of the beam section. A retaining strap 54 is fastened to the upper frame member 48 by bolts 55 and has an offset end thereof provided with an aperture 56 which receives the upper end of the hinge rod 51 and prevents the hinge bracket 53 from becoming disconnected from the rod 51. Referring more particularly to Figure 3 for details of the upper pivot connection, the bracket 53 has a pair of horizontally spaced vertical portions 57, 58 which have horizontally aligned apertures 59 adapted to receive a cylindrical rod 60, the outer end of which is threaded as at 61. The rod 60 is supported on a vertical standard 62 which is supported on the implement draft member 20 and braced by suitable braces 63. The rod 60 extends rearwardly and inwardly to a suitable point of connection (not shown) on the implement body, and is further supported by a suitable brace 64 which rises vertically from a horizontal bracing member 65 connected between the two frame members 21, 22 of the draft frame 20. The rod 60 is rigidly secured to the standard 62 by means of a pair of nuts 66 on the threaded end portion 61 and which are drawn up tightly on opposite sides of the standard 62.

The hinge bracket 53, which is slidably disposed on the rod 60, can be rigidly secured thereto by means of a pair of nuts 67, 68 disposed on the outer threaded end 61. These nuts 67, 68 are tightened against opposite sides of the outer vertical portion 57 of the bracket 53 to hold the latter at any position of adjustment along the rod 60, and thereby adjusting the upper end of the hinge rod 51 of the hitch beam 45 and since the lower end of the rod 51 is held in fixed position by the hinge plate 50, this adjustment causes the outer end of the hitch beam 45 to be raised and lowered.

The upper and lower frame members 48, 49 of the inner section 46 of the hitch beam, extend outwardly in converging relation from the hinge rod 51 and are rigidly interconnected by vertical braces 70 and diagonal bracing members 71 to form a rigid truss that is solely supported on the vertically spaced hinge brackets. The outer ends of the converging frame members 48, 49 are interconnected by means of a vertically disposed plate 72 which also serves as a rear support for the pivot bolt 73 about which the outer beam section 47 is vertically swingable. The hinge bolt 73 is disposed substantially horizontal and extends generally forwardly from the supporting plate 72 and is carried at its forward end on the outer end of a truss member 74 that is spaced forwardly of the converged outer ends of the vertically spaced members 48, 49 and which converges inwardly with the lower frame member 49 to a point of connection therewith adjacent the lower end of the hinge rod 51. The frame member 74 is braced in a forwardly spaced position with respect to the lower frame member 49 by means of a brace 75.

The outer beam section 47 comprises a pair of outwardly converging front and rear beam members 80, 81, the inner ends being spaced to fit between the supporting plate 72 and the forward member 74 of the inner section, and the members 80, 81 are journaled on the hinge bolt 73 for vertical swinging movement about the bolt as an axis relative to the inner beam section 46. The hinge joint between the beam sections 46, 47 is strengthened by a bearing strap 82 which is rigidly bolted to the rear frame member 81 and is offset rearwardly at its inner end and suitably apertured to receive the hinge bolt 73, thus providing an outboard bearing for the beam member 81. Likewise, a similar supporting strap is indicated at 83 and is bolted to the forward member 74 of the inner beam section.

The articulated hitch beam 45 is swingable in a generally horizontal plane about the axis of the hinge rod 51 for the purpose of adjusting the angle at which it extends laterally from the implement 10. The hitch beam is secured in adjusted position by means of an extensible drawbar 85 which connects the hitch beam to the tractor and transmits draft from the tractor to the hitch beam for drawing the wagon 14. The drawbar 85 comprises a pair of front and rear telescoping tubular sections 86, 87, respectively, which are interconnected by means of a bolt 88 inserted through any one of a number of apertures 89 spaced along the outer tubular section 87 and through a suitable aligned aperture in the inner section 86. The forward end of the front drawbar section 86 is connected by a bolt 90 to a pair of straps 91, 92 which are bolted respectively to the drawbar support 93 and the drawbar 25 of the tractor 11. The rear drawbar section 87 extends under the forward member 74 of the inner hitch beam section 46 and is pivotally connected to the latter by means of a vertical pin 94 supported at its upper and lower ends in the vertically spaced frame members 48, 49 and extending through aligned apertures in the rear end of the section 87. It is now evident that by shifting the bolt 88 from one of the apertures 89 to another, the wagon hitch beam 45 is adjustably set in any of a number of angular positions relative to the implement draft frame 20. A U-shaped support 95, best illustrated in Figure 4, extends under the drawbar 85 and is connected to the frame member 74 for the purpose of preventing twisting movement of the drawbar 85 and the inner beam section 46.

The wagon 14 is connected to the outer end of the hitch beam 45 by means of a connecting device, indicated generally by the reference numeral 100, which will now be described. Referring now more particularly to Figures 2 and 5, the connecting device 100 includes a support indicated generally by numeral 101 for slidably receiving and supporting the steering tongue 42 of the wagon, and a latch device 102 by means of which the wagon is adjustably secured to the hitch beam 45 in several longitudinally spaced positions relative to the implement 10. The latch device 102 is preferably in the form of a casting having a downwardly extending spindle 103 formed integral therewith and adapted to extend downwardly through an aperture 104 in the upper side of the end of the hitch beam section 47. The lower end of the spindle 103 is inserted through an aperture 105 in the top portion of the tongue supporting member 101 which is of inverted U-shape, and the latter is supported on a cotter pin 106 inserted through a hole 107 in the end of the spindle 103. Thus the latch member 102 and the tongue supporting member 101 are supported at the outer end of the hitch beam 45 but are free to pivot to a limited extent about a vertical axis through the spindle 103 to accommodate the lateral swinging of the steering tongue 42 relative to the wagon hitch beam during the turns as the equipment is propelled around the field by the tractor 11.

Draft is transmitted from the hitch beam 45 to the wagon 14 through a draft member 108 which lies along the top of the steering tongue 42 and is connected at its rear end thereto by means of a bolt 109. The latch member 102 is provided with an open slot 110 adapted to slidably receive the wagon draft member 108. The wagon draft member 108 is preferably in the form of a tubular bar of rectangular cross section, one side of which is provided with a plurality of spaced apertures 111 adapted to receive the pawl 112 of the latching mechanism. By engaging the pawl 112 successively with each of the apertures 111 spaced along the wagon draft member 108, the longitudinal position of the wagon with respect to the implement elevator 13 can be adjusted in order to properly distribute the ears of corn throughout the wagon box. The latch pawl 112 is slidably supported in an opening 113 in a wall 114 of the groove 110 and the opposite end of the pawl 112 has a cylindrical portion 116 that is inserted through an opening in a second vertical portion 115 spaced from the wall 114. The pawl 112 is urged toward locked position by means of a compression spring 117 coiled around the cylindrical portion 116 and reacting against the inner side of the vertical section 115 of the latch member 102.

The pawl 112 can be slid out of locked position by means of a lever 118 which is pivoted on a vertically disposed pin 119 supported on the casting 102. The short end 120 of the lever 118 is received within a horizontally disposed slot 121 in the intermediate portion of the latch pawl 112 and is secured thereto by means of a vertical pin 122.

The wagon draft member 108 is retained within the groove 110 by means of a retaining pin 125 that is slidably supported in a pair of spaced lugs 127, 128 having aligned apertures to receive the retaining pin 125, the apertures being indicated by reference numeral 126 (see Figure 6). The pin 125 is normally disposed in a position overlapping the top of the wagon draft member 108 and is yieldably held in this position by means of a coil spring 129, one end of which is inserted through a hole 130 in the pin and the other end reacting against the lug 127. The opposite end of the pin is formed in a U-shape to provide a handle by means of which the pin can be easily withdrawn from across the top of the draft member 108. The other leg 131 of the U-shaped pin is slidably held in an aperture 132 in the lug 127 and serves to prevent the pin 125 from being rotated as the wagon draft member 108 is slid through the groove 110.

The tongue supporting member 101 is of inverted U-shape having a pair of downwardly extending side members 135, 136, each side member having a rubbing plate 137 adapted to engage the side of the wagon steering tongue 42 to hold the tongue in proper position for steering the wagon during operation. The wagon tongue 42 is supported during operation on a supporting arm 138 made in the form of a cylindrical rod and having one end turned downwardly, as at 139, and inserted through a suitable opening in a hinge lug 140 which is carried at the lower end of the side member 135. The suporting arm 138 is thus swingably supported at one end on the side member 135 for horizontal swinging movement about the axis of the downwardly turned portion 139. The outer end of the supporting arm is detachably received within a latch indicated generally by reference numeral 142, and comprising a pair of upper and lower jaws 143, 144, respectively. The lower jaw 144 is rigidly carried on the lower end of the side member 136 and projects rearwardly therefrom. The upper latch jaw 143 is pivotally connected by a pin 145 to the side member 136 and is urged downwardly in engagement with the supporting arm 138 by means of a compression spring 146, the latter reacting against an adjustable slide member 147 which is secured to the side member 136 by means of a bolt 148. The bolt 148 is supported in a suitable threaded opening in the side member 136 and extends through a vertically extending slot 149 in the adjustable slide 147. The jaws 143, 144 are so shaped that they hold the supporting arm 138 against rearward swinging movement about the pivot 139 with a force that is proportional to the amount of pressure exerted downwardly by the spring 146, and which pressure is adjusted by adjusting the slide 147 vertically on the side member 136. The wagon steering tongue 42 rests on a roller 150 that is journaled on the supporting arm 138, and thus is freely slidable through the tongue supporting member 101.

A wagon is connected to the hitch beam 45 by swinging the outer section of the latter, 47, downwardly over the tongue 42, the supporting arm being placed in open position as the side members are swung downwardly on each side of the tongue 42. The supporting arm 138 is then snapped into engagement with the retaining jaws 143, 144 and the tongue is then in operating position. Since the wagon draft member 108 is loosely connected to the tongue by the bolt 109, the member 108 can be easily moved to one side to permit the hitch beam section 47 to be swung into this position. The draft member 108 is then placed in the groove 110 after withdrawing the pin 125 away from the groove 110. The empty wagon is preferably placed in its most advanced position with respect to the elevator 13 and with the latch pawl 112 engaged in the most rearward aperture 111 in the draft member 108. As the equipment advances down the field, the corn from the elevator 13 fills the rear end of the wagon box first and when the pile of corn in the rear of the wagon reaches the height of the wagon box, the tractor operator releases the latch pawl 112 from the draft member 108 by pulling on the lever 118 through the medium of a control rope 151 which is connected to the end of the lever 118, thereby causing the wagon to drop behind as the tractor moves forwardly. The rope 151 is immediately released, whereupon the latch pawl 112 drops into the next opening 111 in the draft member 108, thereby causing the wagon to be drawn along in a new position with respect to the elevator 13. In this manner the wagon is dropped back from one position to the next until it is evenly filled with corn from one end to the other and it is then necessary to disconnect the filled wagon and replace it with another empty wagon. The tractor operator releases the full wagon by pulling on the rope 151 and releasing the latch pawl 112 from the foremost opening 111 in the draft member 108, after which the draft member 108 is dropped from the latch member 102 upon continued movement of the tractor, the wagon having stopped because of the interruption of draft force, and finally the wagon tongue 42 slides out of the tongue supporting member 101. Just before the wagon tongue is withdrawn from the supporting member, the shoe 152, which projects downwardly from the lower portion of the pole cap 153, engages the supporting arm 138 and breaks the latter away from its latching jaws 143, 144. In this manner the supporting arm 138 is swung to its open position preparatory to receiving the steering tongue of the empty wagon.

In order to swing the outer section 47 of the hitch beam 45 out of the way to permit the empty wagon to be drawn up into the proper position for connection with the hitch device, we have provided means in the form of a spring 155 for urging the outer section 147 toward its raised or inoperative position upon being released from its connection with the wagon tongue. The spring means comprises a coiled tension spring 155 connected at one end to the inner hitch beam section 46 by means of an eye bolt 156 which engages a lug 157 fixed to the lower frame member 49. The opposite end of the spring 155 is connected to a rod 158 which is anchored to a standard 159 which extends upwardly from the member 81 of the outer hitch beam section 47. The standard comprises a structural member which is bent into an acute angle to provide an outwardly and downwardly extending bracing portion 160 which is connected to the frame member 81 near the outer end thereof. A bracing member 161 interconnects the two legs 159, 160 for strengthening the standard. The spring 155 is provided with sufficient tension to raise the vertically swingable hitch beam section 47 alone, but the spring tension is insufficient to raise the combined weight of the beam section and the wagon tongue when they are connected together. It has been found desirable, however, to limit the extent of upward swinging movement of the outer beam section 47 during operation, particularly when a wagon of the stiff pole type is connected to the beam. In this type of wagon the pole or draft tongue 42 is supported from the wagon in a generally horizontally extending position and at times when the implement and wagon are being drawn over rolling ground, the tongue is sometimes lifted due to the angularity of the slope upon which the wagon is running, to such an extent that the wagon tongue is moved appreciably closer to the tractor causing the wagon to follow inwardly closer to the corn picker. In such cases the weight of the tongue and outer beam section 47 is sometimes insufficient to swing the beam section back to a horizontal position after the wagon is once more on level ground for the weight of the tongue and outer beam section is resisted not only by the tension of the spring 155 but also by the force of the side draft on the wagon tending to swing the wagon into trailing position in line with the tractor. To overcome this difficulty we have provided means for limiting the angle to which the outer hitch beam section 47 can be raised relative to the inner section 46. This limiting means is in the form of a latch mechanism 165 which is disengageable from the tractor operator's position to permit the outer beam section to swing to a vertical position when a full wagon is being released, but which permits the outer beam section 47 to swing vertically through a limited angle during the harvesting operation. We have found by experiment that it is desirable to limit the vertical swinging of the outer beam section to an angle of about 17 degrees above the horizontal during operation. This amount of vertical swinging is sufficient to accommodate the movement of the implement and wagon over uneven ground, but is not sufficient to allow the tongue and beam section to become hung up, as described heretofore. The latch mechanism comprises a slide bar 166 which is preferably of tubular rectangular construction and is pivotally connected to a bracket 167 which is fixed to the standard 159, as by welding, and is vertically swingable about a pivot bolt 168. The slide bar 166 is slidably received within a guide casting 169, the latter being pivotally mounted on a vertically extending lug 170 fixed to the upper frame member 48 of the inner hitch bar section 46, for rotation about a pivot bolt 171. As best illustrated in Figure 9, the slide bar 166 is held within the guide casting 169 by means of a latch member 172 having a hinge pin portion 173 engaged under a hook portion 174 on the guide casting 169 providing for swinging movement of the member 172 about the axis of the hinge pin 173. A latch dog 175 is fixed to the opposite end of the latch member 172 and is positioned to engage an aperture 176 in the side of the tubular slide bar 166. The latch member 172 is urged toward latched position by means of a compression coil spring 177 which bears against the side of the latch member 172 and reacts against a washer 178 fastened to the outer end of a retaining pin 179 by means of a cotter 180. The pin 179 extends axially through the coil spring 177 and through a hole 181 in the member 172 and is anchored in the guide casting 169. A control rope 182 is tied to a ring 183 at the end of the latch member 172 and the rope 182 extends to within easy reach of the tractor operator. In Figure 9 the slide bar 166 is illustrated in the position in which the outer hitch beam section 47 is raised to its upper limit during operation, which is preferably at an angle of 17 degrees above the normal position in line with the inner section 46. It will be noted that the back space 184 of the latch dog 175 is inclined at such an angle to the slide bar 166 that the bar is free to move toward the right, as viewed in Figure 9, when the outer beam section is held down by the weight of the wagon tongue 42. The outer beam section 47 is prevented from swinging below the last named position by means of a key 185 which acts as a stop and engages the end 186 of the guide casting 169.

It is now evident that as the wagon tongue 42 is withdrawn from the tongue supporting member 101, the shoe 152 disengages the supporting arm 138 after which the spring 155 draws the outer beam section 47 up to an angle of approximately 17 degrees whereupon the latch dog 175 engages the aperture 176. The tractor operator then pulls the rope 182 withdrawing the dog 175, and the spring 155 then pulls the beam section to the vertical position indicated in Figure 4. It is evident that during operation if the wagon should roll over a severe incline which would tend to force the outer beam section above the 17 degree angle, the latch mechanism 165 would lock the articulated hitch beam sections together and further upward movement of the wagon tongue would tend to raise the whole wagon hitch beam 45 as a unitary structure. There is enough flexibility in the hitch beam to permit a reasonable amount of distortion at such times to accommodate a certain amount of such excessive tongue movements. The combined weight of the wagon tongue and the entire hitch beam structure, however, are sufficient to return the wagon tongue to its proper operating position after the wagon is once more on level ground.

When transporting the corn picker from one field to another through narrow gates and roads, it is desirable to have the picker trailing directly behind the tractor rather than in offset position. Referring now more particularly to Figure 10, we have provided means for reconnecting the wagon hitch beam 45 to the implement draft frame 20, whereby the hitch beam serves as the draft member for the implement during transport. For this purpose the hitch beam 45 is turned on its side with the bottom portion turned toward the gathering mechanism 12. The hinge rod 51 is placed generally parallel to the implement axle 15 and is fastened to the draft frame 20 by means of a pair of laterally spaced vertically extending ears 190, 191. One of the ears 190 can best be seen in Figure 2 and is permanently fixed, as by welding, to the frame member 21 of the draft frame 20 immediately behind the standard 62. An opening 192 is provided in the ear 190 for receiving the end of the hinge bar 51 which is normally upward during harvesting operation. The other ear 191 is detachably secured, as by bolt 193, to a generally horizontal bracing member 194 connected between the frame member 22 and the implement axle 15. The ear itself 191 extends upwardly and has a hole adapted to receive the opposite end of the hinge rod 51 and is bent substantially at right angles to provide a horizontal supporting portion 195 which rests upon the member 194 and is bolted thereto by the bolt 193, the latter being removed in order to connect the hitch beam in transport position. When thus connected, the hitch beam is swingable vertically about the transverse axis of the hinge rod 51 and therefore in order to transport the implement, the draft frame 20 requires a second point of support on the hitch beam 45. For this purpose we have provided a supporting rod 200 which is inserted through a pair of aligned openings in a pair of upwardly extending lugs 201, 202, spaced along the frame member 22 and rigidly fixed thereto. The forward end of the supporting rod 200 is bent to form a handle 203, as best shown in Figure 2, and the opposite end of the rod is threaded to receive a securing bolt 204. After the hitch beam has been secured in place by the ears 190, 191, the supporting rod 200 is inserted through the lugs 201, 202 above the truss beams 48, 49, and thus when the hitch beam is raised and connected to the tractor, the draft frame 20 of the implement is supported thereon. In operating position the trussed beam members 48, 74, 80, 81 lie in a generally horizontal plane whereby the greatest resistance of the wagon hitch beam 45 to bending is opposed to a force acting rearwardly at its outer end; whereas in transport position the greatest resistance of the wagon hitch beam to bending is opposed to a vertically acting force, so that maximum strength of the beam is obtained for supporting the implement on the tractor drawbar 25. The forward end of the hitch beam is pivotally connected to the tractor drawbar 25 by means of a vertical pivot bolt 205 extending through a hole 206 provided for this purpose and best shown in Figure 2. During transport the latch mechanism 172 prevents the hitch beam from buckling in a horizontal plane when the tractor makes a right turn. During transport the drawbar 85 is removed from its connection on the pivot pin 94 and is laid across the hitch beam and draft frame in any suitable position for transporting the latter and is secured thereto preferably by inserting a bolt through the forward end of the inner section 86 and through a hole 207 in the member 81 of the outer section 47, as best shown in Figure 2.

We do not intend our invention to be limited to the details shown and described herein except as set forth in the following claims.

We claim:

1. A hitch connection between a tractor and an agricultural implement and a wagon having a steering tongue, comprising a draft member connecting said implement to said tractor, a vertically extending standard supported on said draft member, a threaded member carried on said standard, a bracket hung on said threaded member, a pair of adjusting nuts disposed on the latter on opposite sides of said bracket, a second bracket carried on said draft member in vertically spaced relation to said first bracket, and a wagon hitch beam supported on said brackets.

2. A hitch connection between a tractor and an agricultural implement and a wagon having a steering tongue, comprising a draft member connecting said implement to said tractor, a vertically extending standard supported on said draft member, an articulated wagon hitch beam comprising an inner section including vertically spaced interconnected frame members pivotally supported on said standard for swinging movement about a generally vertical axis, an outer section including horizontally spaced, interconnected frame members, and means for pivotally connecting said sections together for swinging movement about a generally horizontal axis, including a pair of horizontally aligned hinge means and a frame member on said inner section spaced horizontally from said interconnected frame members for supporting one of said hinge means.

3. An articulated wagon hitch beam comprising an inner supporting section and an outer tongue receiving section, said inner section comprising a pair of vertically spaced outwardly converging frame members having a pair of vertically aligned pivot supports at the inner ends thereof serving as the sole support of said articulated beam, and a third frame member diverging outwardly from one of said outwardly converging members, a pair of generally horizontally aligned hinge joints, one of said joints being carried on the outer converged ends of said vertically spaced frame members and the other being carried on the outer end of said outwardly diverging frame member, said outer beam section being supported on said hinge joints for vertical swinging movement relative to said inner beam section and comprising a pair of frame members spaced horizontally at their inner ends and connected to said hinge joints, and converging outwardly therefrom, and a wagon tongue receiving device supported at the outer end of said outer beam section.

4. A hitch connection between an agricultural implement and a wagon disposed at one side thereof and having a steering tongue, comprising an articulated hitch beam supported on said implement and extending laterally therefrom, said beam comprising an inner supporting section and an outer wagon tongue receiving section supported on said inner section by means providing for movement between extended operating position and retracted position, biasing means tending to move said outer section toward said retracted position and releasable detent means for restraining said movement of said outer section.

5. In a hitch connection between an agricultural implement and a wagon disposed at one side thereof and having a steering tongue, a hitch beam member extending laterally from said implement and supported thereon by means providing for movement between normal extended position and retracted inoperative position, biasing means tending to urge said beam toward said retracted position, and releasable detent means for restraining said movement of said beam.

6. In a hitch connection between an agricultural implement and a wagon disposed at one side thereof and having a steering tongue, a hitch beam member extending laterally from said implement and pivotally supported thereon by means providing for vertical swinging movement between an extended operating position and a raised inoperative position, releasable means for connecting said beam member to the wagon tongue, spring means connected to said beam member for urging the latter toward said raised position, and releasable latch means for holding said beam member in said operating position.

7. In a hitch connection between an agricultural implement and a wagon disposed at one side thereof and having a steering tongue, a hitch beam member extending laterally from said implement and pivotally supported thereon by means providing for vertical swinging movement between an extended operating position and a raised inoperative position, means releasable by remote control by the operator of the implement for connecting said beam member to the wagon tongue, spring means connected to said beam member and adapted to raise the latter to said inoperative position when released, latch means connected between said beam member and said implement for releasably locking said beam member against being raised by said spring means, and remote control means under control of the operator for releasing said latch means.

8. A hitch connection between an agricultural implement and a wagon disposed at one side thereof and having a steering tongue, comprising an articulated hitch beam supported on said implement and extending laterally therefrom, said beam comprising an inner supporting section and an outer wagon tongue receiving section supported on said inner section by means providing for movement between extended operating position and retracted position, means releasable by remote control by the operator of the implement for connecting said outer section to said wagon tongue, a spring connected between said beam sections and energized in the extended position of the latter and adapted, upon release of said tongue connecting means, to move said outer section to said retracted position, latch means connected between said sections for releasably locking the latter in said operating position, and remote control means under control of the operator for releasing said latch means.

9. In a hitch connection between an agricultural implement and a wagon having a steering tongue, a draft beam, and a tongue receiving member on said beam and adapted to embrace and support said tongue during operation, including a part forming the lower portion of said member upon which said tongue normally rests, said part being displaceable to release said tongue, and means attached to said tongue for displacing said supporting part responsive to forward movement of said receiving member relative to said wagon tongue.

10. In a hitch connection between an agricultural implement and a wagon having a steering tongue, a draft beam, and a tongue receiving member on said beam and adapted to embrace and support said tongue during operation, including a hinged part forming one side of said tongue embracing member and means for fastening said part in tongue retaining position, and a projection near the end of said tongue adapted to engage said part when said tongue is withdrawn from said receiving member, for unfastening said hinged part and swinging the latter open preparatory to receiving another wagon tongue.

11. In a hitch connection between an agricultural implement and a wagon having a steering tongue, a draft beam member pivotally connected to said implement for vertical swinging movement about a generally fore and aft extending axis, and a tongue receiving member on said beam and adapted to embrace and support said tongue during operation, including a part forming the lower portion of said receiving member on which said tongue is carried during operation, said part being swingably supported at one end thereof at one side of said receiving member and releasably fastened at its opposite end to the other side of said receiving member, whereby said beam can be swung on said pivotal connection downwardly over said tongue with said tongue supporting part in open position, after which the latter is fastened in closed position under said tongue, and means on said tongue engaging said receiving member as the tongue is withdrawn from the latter, for tripping open said tongue supporting part.

12. In a hitch connection between an agricultural implement and a wagon having a steering tongue, a draft beam, and a tongue receiving member supported below said beam and adapted to embrace and support said tongue during operation, said member including a pair of vertical side members depending from said beam, a tongue supporting bar hinged to one of said side members, and latching means for releasably supporting said bar on the other of said side members.

13. In combination with an implement having a generally forwardly extending draft frame adapted to be connected to a tractor for propelling the implement in offset relation with respect to the tractor, a generally laterally extending wagon hitch beam having a pair of vertically aligned hinge means for detachably supporting the same on said implement in laterally extending position for horizontal swinging movement relative thereto, a pair of generally transversely aligned hinge means on said implement for detachably connecting said hitch beam to said implement in generally forwardly extending position for connection to a tractor for propelling the implement in line with the tractor during transport, and means for securing said hitch beam to said implement forwardly of said last mentioned hinge means to restrain swinging movement between said beam and said implement during transport.

14. In combination with an implement having a generally forwardly extending draft frame adapted to be connected to a tractor for propelling the implement in offset relation with respect to the tractor, a wagon hitch beam extending laterally from said draft frame, a standard mounted on said draft frame for supporting said hitch beam and having vertically aligned hinge means for detachably connecting said hitch beam thereto for movement about a vertical axis, a pair of generally transversely aligned hinge means mounted on said draft frame for detachably connecting said hitch beam to said draft frame in generally forwardly extending position for connection to a tractor for propelling the implement in line with the tractor during transport, and means for securing said hitch beam to said draft frame forwardly of said last mentioned hinge means to restrain swinging movement between said beam and said draft frame during transport.

15. In a hitch device of the class described, an implement draft member, a wagon hitch beam connected to said draft member and extending laterally therefrom, a drawbar pivotally connected to said hitch beam and extending longitudinally therefrom and adapted to be connected to a draft means, said hitch beam including a frame member rigidly connected to said hitch beam and spaced longitudinally along said drawbar from the pivot connection of the latter with said hitch beam, said frame member engaging said drawbar at a point spaced appreciably from said pivotal connection of the latter to resist twisting of the hitch beam relative to the drawbar.

16. In a hitch device of the class described, an implement draft member, a wagon hitch beam connected to said draft member and extending laterally therefrom, a drawbar pivotally connected to said hitch beam and extending forwardly therefrom and adapted to be connected to a tractor, a frame member on said hitch beam extending forwardly of the pivot connection of said drawbar with said hitch beam and engaging said drawbar to resist relative twisting therebetween in one direction, and means fixed to said frame member and embracing said drawbar for resisting relative twisting therebetween in the opposite direction.

17. A hitch connection between a tractor and an agricultural implement and a wagon having a steering tongue, comprising a draft member connecting said implement to said tractor, a wagon hitch beam, and a pair of vertically spaced supports for hanging said beam on said implement providing for generally horizontal swinging movement, one of said supports being adjustable and comprising a threaded member, a bracket slidable on said threaded member, and a pair of adjusting nuts disposed on the latter on opposite sides of said bracket.

18. In combination with an implement having a generally forwardly extending draft frame adapted to be connected to a tractor for propelling the implement in offset relation with respect to the tractor, a wagon hitch beam attached to said implement and extending generally laterally therefrom, said beam having its greatest resistance to bending in a certain axial plane and being disposed in a position in which its greatest resistance to bending is opposed to a force acting horizontally rearwardly at its outer end, and means for optionally attaching said beam to said implement in a forwardly extending position for transport purposes with the beam disposed with its plane of greatest resistance to bending shifted substantially ninety degrees to oppose a vertically acting force at its outer end, 19. In combination with an implement having a generally forwardly extending draft frame adapted to be connected to a tractor for propelling the implement in offset relation with respect to the tractor, a wagon hitch beam attached to said implement and extending generally laterally therefrom, said beam having a truss member normally disposed in a generally horizontal plane with said beam to provide maximum strength for drawing a wagon, and means for optionally attaching said wagon hitch beam to said implement in a forwardly extending position for transport purposes with said truss member in a substantially vertical plane with said beam to provide maximum strength for supporting the forward end of the implement on a tractor.

20. The combination set forth in claim 18, with the further provision of means adjacent the outer end of said wagon hitch beam providing a pivotal connection with the tractor on an axis substantially in the plane of greatest resistance of the beam to bending.

21. The combination set forth in claim 19, with the further provision of means adjacent the outer end of said wagon hitch beam providing a pivotal connection with the tractor, comprising means apertured on an axis substantially in the plane of said beam and truss member.

22. A hitch connection between a tractor and an agricultural implement and a wagon having a steering tongue, comprising a draft member connecting said implement to said tractor, a vertically extending standard supported on said draft member, a wagon hitch beam comprising vertically spaced upper and lower outwardly converging members interconnected at their outer ends, and means for adjustably connecting the inner ends of said members to said standard at vertically spaced points comprising a bracket interconnecting one of said members with one end of said standard, a second bracket having an aperture, threaded bolt means extending therethrough, nuts engaging said bolt means on opposite sides of said bracket, and means connecting said second bracket and bolt means between the other of said converging members and the other end of said standard.

23. A hitch connection between a tractor and an agricultural implement and a wagon having a steering tongue, comprising a draft member connecting said implement to said tractor, a vertically extending standard supported on said draft member, a wagon hitch beam comprising vertically spaced upper and lower outwardly converging members interconnected at their outer ends, and means for adjustably connecting the inner ends of said members to said standard at vertically spaced points comprising a bracket pivotally connected with said draft member at the lower end of said standard and with said lower beam member for swinging movement about a vertical axis, and means for pivotally connecting the upper beam member with the upper end of said standard comprising a pivot member disposed coaxially with the pivot connection of said lower bracket, a bracket connected with said pivot member and having an aperture therein, a threaded member extending through said aperture, and a pair of nuts engaging said threaded member on opposite sides of said bracket.

WILBUR J. COULTAS.
STANLEY E. HILL.